US012787903B2

(12) United States Patent
Sietsema et al.

(10) Patent No.: US 12,787,903 B2
(45) Date of Patent: Nov. 10, 2026

(54) SYSTEMS AND METHODS FOR A NOTCHED CYLINDER PIN ON A THREE-POINT HITCH

(71) Applicant: CNH Industrial America LLC, New Holland, PA (US)

(72) Inventors: Chad Sietsema, New Holland, PA (US); John T. Rasset, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 1116 days.

(21) Appl. No.: 17/892,848

(22) Filed: Aug. 22, 2022

(65) Prior Publication Data

US 2024/0057493 A1 Feb. 22, 2024

(51) Int. Cl.

*A01B 59/06* (2006.01)
*A01B 59/00* (2006.01)
*A01B 59/043* (2006.01)

(52) U.S. Cl.

CPC .......... *A01B 59/068* (2013.01); *A01B 59/002* (2013.01); *A01B 59/043* (2013.01)

(58) Field of Classification Search

CPC ... A01B 59/068; A01B 59/002; A01B 59/043; A01B 59/06; A01B 59/066
USPC .................................................. 172/439, 272
See application file for complete search history.

(56) References Cited

U.S. PATENT DOCUMENTS 788,398 A 4/1905 Fladby
2,439,692 A 4/1948 Mckay
2,673,506 A * 3/1954 Miller et al. ......... A01B 59/042 172/450
2,901,787 A 9/1959 Whistler, Sr. et al.
3,596,947 A * 8/1971 Ishihara .................. H02G 7/05 174/150
3,859,706 A 1/1975 Williams et al.
5,593,264 A 1/1997 Schlegel et al.

(Continued)

FOREIGN PATENT DOCUMENTS

EP 3872356 A1 * 9/2021 .......... F16B 12/2036

OTHER PUBLICATIONS

4pcs High hardness mirror rolling reamer D1.5-15mm rolling head part roll needle with blind / through hole rolling pin roll ball accessed on Feb. 8, 2022 from https://www.aliexpress.com/item/32949765655.html.

(Continued)

*Primary Examiner* — Christopher J Sebesta
*Assistant Examiner* — Joel F. Mitchell
(74) *Attorney, Agent, or Firm* — Foley & Lardner LLP

(57) ABSTRACT

A three-point hitch includes a frame, a lift cylinder coupled to the frame and having a lift cylinder boss, a pin bore extending through the lift cylinder boss, and a pin configured to be received within the pin bore so that the pin extends through the lift cylinder boss and couples the lift cylinder to the frame. The pin bore extends along a boss axis and includes a first bore end and an axially opposing second bore end. The pin bore defines an axial bore length between the first bore end and the second bore end. The pin defines a pin axis and includes a first pin end, an axially opposing second pin end, and a cylindrical body. An axial pin length defined between the first pin end and the second pin end is less than the axial bore length.

18 Claims, 16 Drawing Sheets

(56) References Cited

U.S. PATENT DOCUMENTS

| | | | | |
|---|---|---|---|---|
| 5,601,146 | A * | 2/1997 | Schlegel et al. ..... | A01B 59/068 172/450 |
| 5,988,023 | A | 11/1999 | Townsend et al. | |
| 6,230,817 | B1 * | 5/2001 | Haugen ................ | A01B 59/068 172/7 |
| 6,287,079 | B1 | 9/2001 | Gosling et al. | |
| 6,443,236 | B2 * | 9/2002 | Staude ................. | A01B 59/068 172/439 |
| 8,408,325 | B2 * | 4/2013 | Kapfer ................. | A01B 59/004 172/663 |
| 8,555,995 | B2 * | 10/2013 | Harris .................. | A01B 59/064 172/810 |
| 10,595,453 | B2 * | 3/2020 | Woelfle et al. ........ | B60D 1/141 |
| 10,639,752 | B2 | 5/2020 | Rasmussen | |
| 10,844,892 | B2 | 11/2020 | Matzler | |
| 2011/0147020 | A1 * | 6/2011 | Waltz et al. ......... | A01B 59/066 172/439 |

OTHER PUBLICATIONS

Grooved Pin, System of Measurement Inch, Basic Material Low Carbon Steel, Material Grade 1215, Fastener Finish Zinc, Pin Dia. 25/64 In., Overall Length 1 In., Large End Dia. 0.394 In., Small End Dia. 0.3750 In., Length Tolerance /−0.010 In., Large End Dia. Tolerance /−0.0025 In., Small End Dia. Tolerance /−0.005 In., Single Shear Strength (PSI)—, Double Shear Strength (Lbs.) 11000, Rockwell Hardness B85, Package Quantity 25 accessed on Feb. 8, 2022.

Mig-welding.co.uk Forum; Removing a snapped Roll pin in a blind hole—BMW 1200GSRWD posted Jan. 12, 2014; accessed Feb. 8, 2022 at https://www.mig-welding.co.uk/forum/threads/removing-a-snapped-roll-pin-in-a-blind-hole-bmw-1200gs-rwd.45049/page-3.

Perthstreetbikes.com Forum; Roll Pin Removal—Blind Hole posted Apr. 1, 2010; accessed on Feb. 8, 2022 at https://forum.perthstreetbikes.com/forum/motorcycle-topics/mods-being-technamikle-product-reviews/100234-roll-pin-removal-blind-hole.

* cited by examiner

SYSTEMS AND METHODS FOR A NOTCHED CYLINDER PIN ON A THREE-POINT HITCH

BACKGROUND

The present disclosure relates generally to a three-point hitch having one or more lift cylinders. Certain work vehicles, such as tractors, include a three-point hitch configured to engage and couple to a towed implement.

SUMMARY

One embodiment relates to a three-point hitch for a vehicle. The three-point hitch includes a frame having an inner frame wall and an outer frame wall, a lift cylinder coupled to the frame and having a lift cylinder boss coupled to an end of the lift cylinder, a pin bore extending between the inner frame wall and the outer frame wall and through the lift cylinder boss, and a pin configured to be received within the pin bore so that the pin extends through the lift cylinder boss and couples the lift cylinder to the frame. The pin bore extends along a boss axis and includes a first bore end and an axially opposing second bore end. The pin bore defines an axial bore length between the first bore end and the second bore end. The pin defines a pin axis and includes a first pin end, an axially opposing second pin end, and a cylindrical body. The cylindrical body is interrupted by a pin notch and a retrieval surface arranged at the second pin end. An axial pin length defined between the first pin end and the second pin end is less than the axial bore length.

Another embodiment relates to a three-point hitch for a vehicle. The three-point hitch includes a frame having an interior plate, a lift cylinder coupled to the frame and having a lift cylinder boss coupled to an end of the lift cylinder, a pin bore extending axially through the lift cylinder boss along a boss axis, and a pin configured to be received within the pin bore so that the pin extends through the lift cylinder boss and couples the lift cylinder to the frame. The pin bore includes a first bore end and an axially opposing second bore end. The lift cylinder boss includes a first cylinder boss end and an axially opposing second cylinder boss end. The second cylinder boss end being arranged adjacent to the second bore end. A removal length is defined along the boss axis between the second cylinder boss end and the interior plate. The pin defines a pin axis, a first pin end, and an axially opposing second pin end. An axial pin length defined between the first pin end and the second pin end is less than the removal length so that as the pin is removed from the pin bore, the first pin end moves past the second cylinder boss end prior to the second pin end engaging the interior plate.

Still another embodiment relates to a three-point hitch for a vehicle. The three-point hitch includes a frame having an inner frame wall and an outer frame wall and a lift cylinder coupled to the frame and including a lift cylinder boss coupled to an end of the lift cylinder. The inner frame wall includes an inner frame cylindrical boss extending outwardly from the inner frame wall in a direction toward the lift cylinder boss. The outer frame wall includes an outer frame cylindrical boss extending outwardly from the outer frame wall in a direction toward the lift cylinder boss. The outer frame cylindrical boss, the inner frame cylindrical boss, and the lift cylinder boss are axially aligned along a boss axis and combine to define a pin bore that extends along the boss axis. The pin bore includes a first bore end and an axially opposing second bore end. The three-point hitch further includes a pin configured to be received within the pin bore so that the pin extends through the lift cylinder boss and couples the lift cylinder to the frame. The pin defines a pin axis and includes a first pin end, an axially opposing second pin end, and a cylindrical body. The cylindrical body is interrupted by a pin notch and a retrieval surface arranged at the second pin end. The retrieval surface defines a height between the pin axis and the retrieval surface that is less than a radius defined by the cylindrical body so that when the pin is inserted into the pin bore and the second end of the pin is inserted past the second bore end of the pin bore, a tool is configured to be inserted over the retrieval surface and remove the second end of the pin outwardly past the second bore end.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
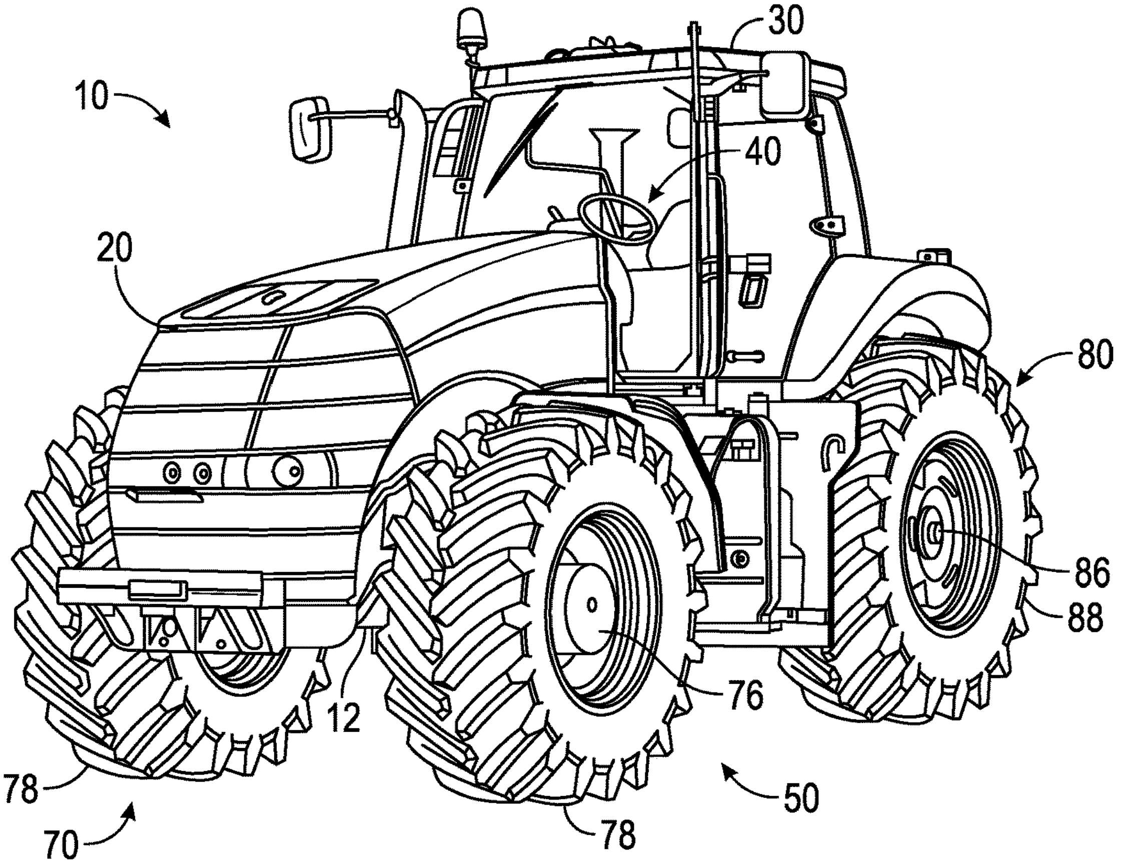
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

In general, off-road or agricultural vehicles utilize a three-point hitch to couple work implements to the vehicle. Conventional three-point hitch designs include one or more lift cylinders that are coupled to a frame of the three point hitch using a pin. Developments in vehicle and hitch technology have resulted in an increasing amount of components being installed on and adjacent to the hitch. These added components make it difficult to access and remove the pin to service the lift cylinder.

According to an exemplary embodiment, a three-point hitch includes a pin configured to be received within a pin bore so that the pin extends through a lift cylinder boss and couples a lift cylinder to a frame of the three-point hitch. The pin defines a pin axis and includes a first pin end, an axially opposing second pin end, and a cylindrical body. In some embodiments, an axial pin length defined between the first pin end and the second pin end is less than an axial bore length of the pin bore, so that the pin is capable of being removed from the pin bore without engaging an interior plate of the three-point hitch that is arranged adjacent to the pin bore. That is, the axial pin length is less than a removal length is defined along between an end of the cylinder boss and the interior plate. The axial pin length being less than the removal length enables the first pin end to be removed past the second cylinder boss end prior to the second pin end engaging the interior plate. In this way, for example, the pin can be removed a sufficient distance to clear the cylinder boss and enable the lift cylinder to be services, without the pin interfering with the interior plate arranged within the three-point frame.

In some embodiments, the pin bore may define a blind hole with an outer plate being arranged adjacent or coupled to the three-point hitch and blocking removal of the pin from an exterior of the three-point hitch. With the axial pin length being less than the axial bore length, the pin may be susceptible to over-insertion so that the second pin end extends through and past an axial end of the pin bore. To account for this potential scenario, the pin includes a cylindrical body that is interrupted by a pin notch and a retrieval surface arranged at the second pin end. The retrieval surface defines a height between the pin axis and the retrieval surface that is less than a radius defined by the cylindrical body so that when the pin is inserted into the pin bore and the second end of the pin is inserted past the axial end of the pin bore, a tool is configured to be inserted over the retrieval surface and remove the second end of the pin outwardly past the second bore end. As such, the pin is designed to define a gap between the retrieval surface and an outer periphery of the pin bore to enable a tool to be inserted past the retrieval surface and engage the pin to facilitate removal of the pin.

Overall Vehicle

Figure 2:
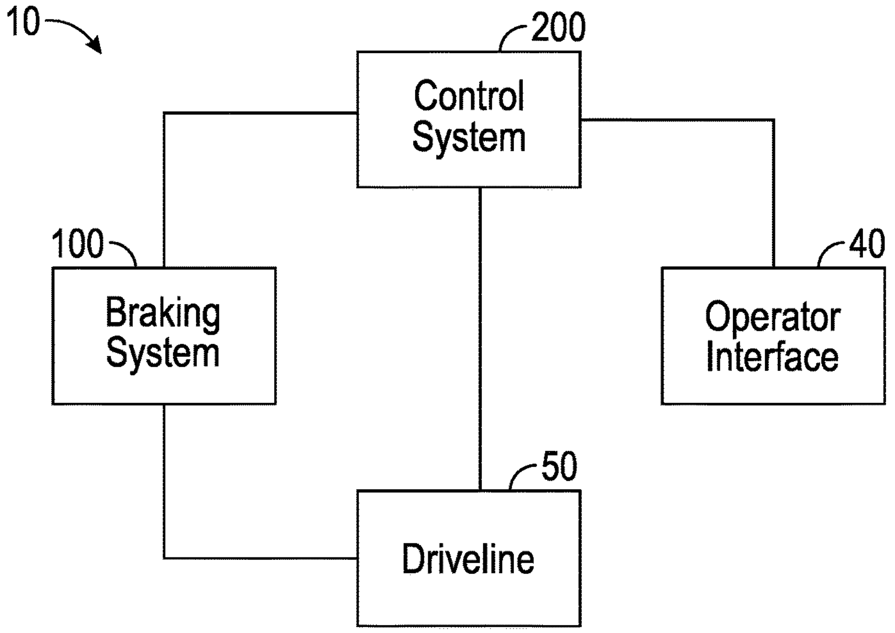
FIG. 2 is a schematic block diagram of the vehicle of FIG. 1, according to an exemplary embodiment.
Figure 3:
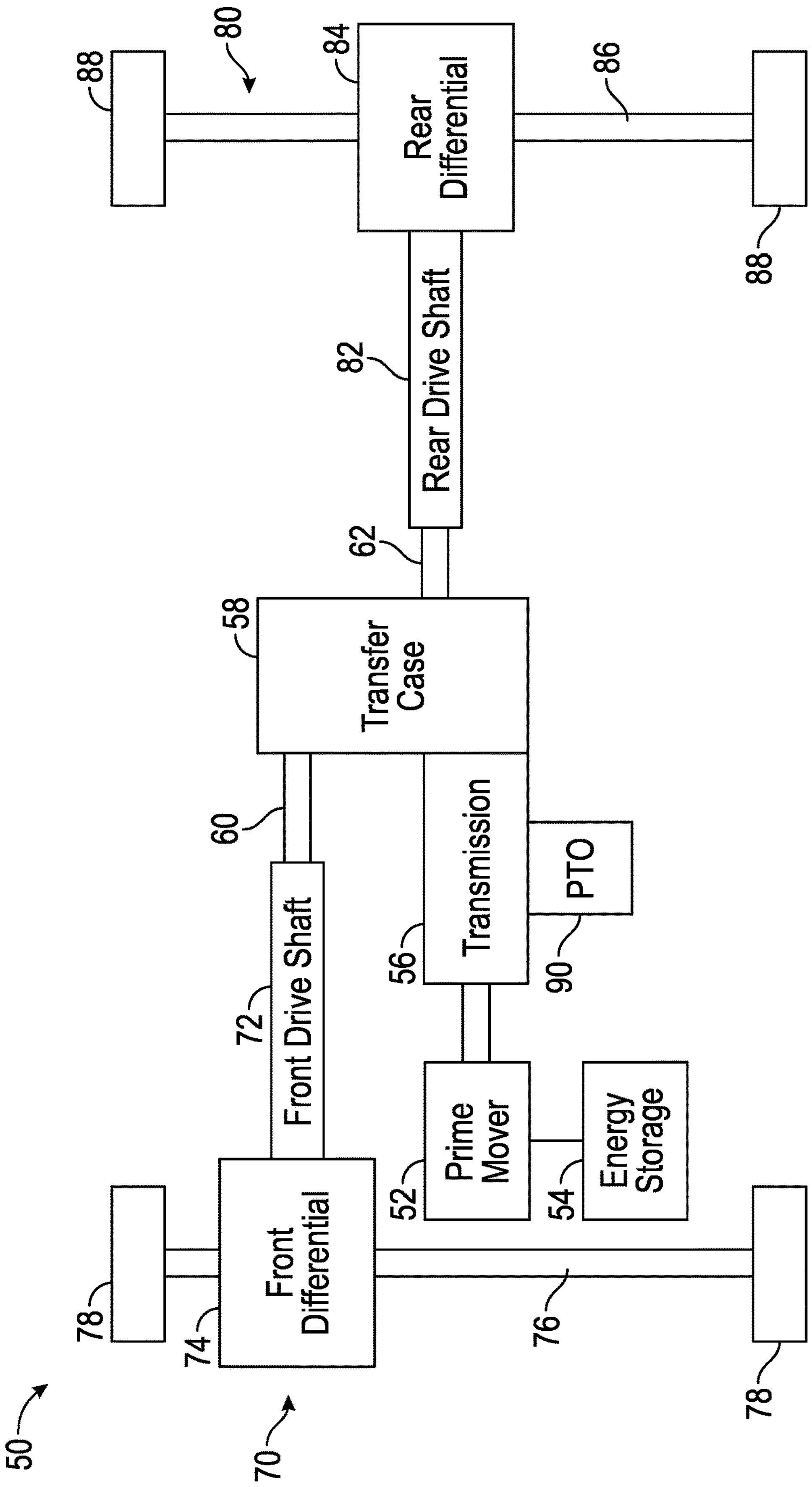
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a bedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Three-Point Hitch with a Notched Cylinder Pin

Figure 4:
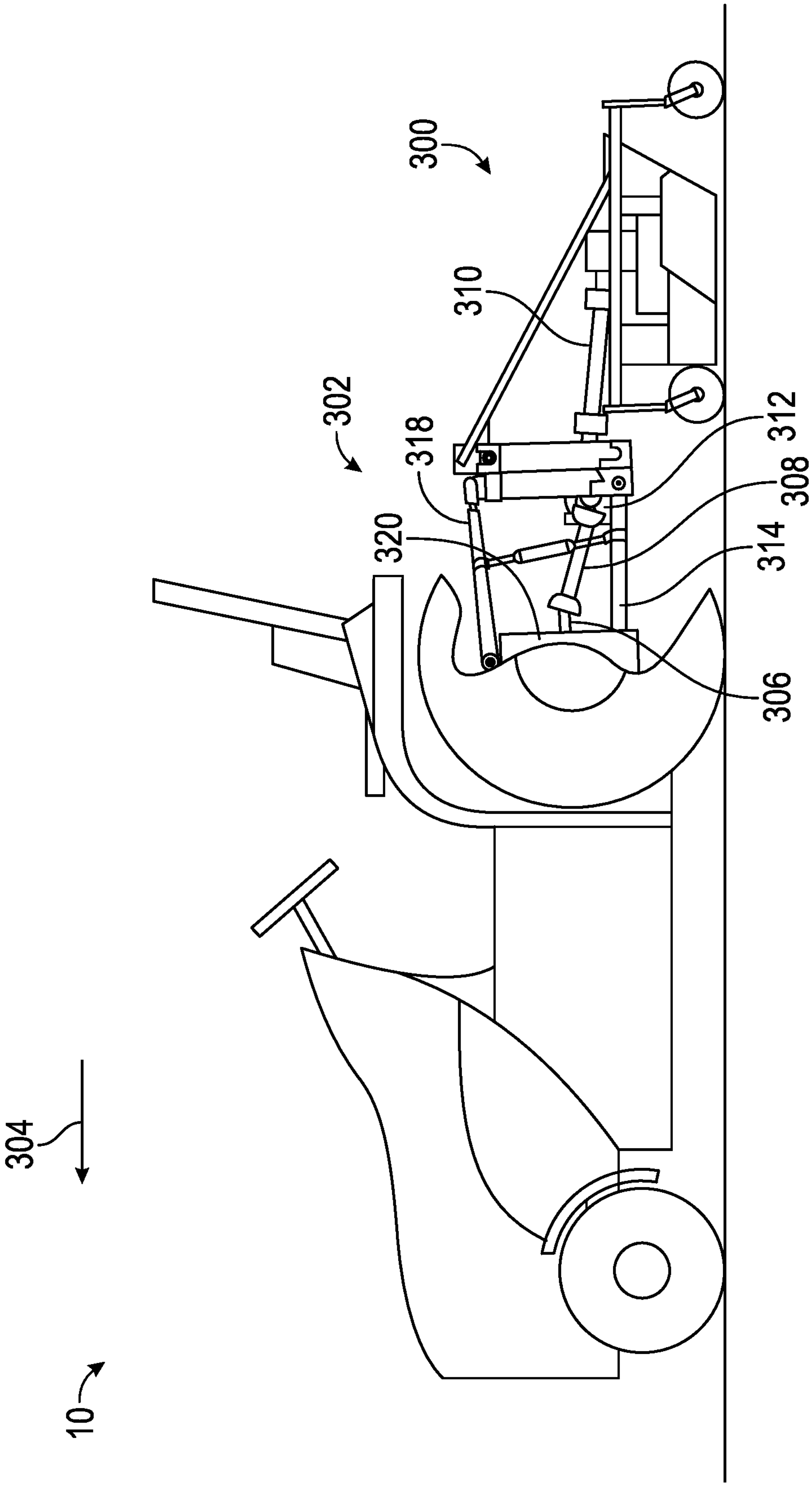
FIG. 4 is a side view of a vehicle coupled to an implement using a three-point hitch, according to an exemplary embodiment.

As described herein, the vehicle 10 may be coupled to one or more attached implements and/or trailed implements. FIG. 4 illustrates an embodiment of the vehicle 10 coupled to an implement 300 via a hitch, shown as three-point hitch 302. The vehicle 10 is configured to tow the implement 300 (e.g., through a field) along a direction of travel 304. In the illustrated embodiment, the implement 300 is a powered implement, such as a spreader, a rotary mower, or a rotary tiller. The implement 300 is powered by a power-take off (PTO) shaft 306 that is coupled to the PTO 90, so that rotation of the PTO shaft 306 drives rotation of one or more rotary components of the implement 300 (e.g., a rotary spreader system, mower blades, or a rotary tillage assembly, etc.). In the illustrated embodiment, the PTO shaft 306 includes a telescoping portion 308 (e.g., a telescoping actuator or linear actuator) configured to facilitate adjustment of a length of the PTO shaft 306 to accommodate different types of powered implements. However, in other embodiments, the vehicle 10 may include a non-telescoping PTO shaft. The PTO shaft 306 is coupled to a corresponding shaft 310 of the implement 300, and the corresponding shaft 310 of the implement 300 is configured to drive rotation of the rotary component(s) of the implement 300. The PTO shaft 306 and the corresponding shaft 310 of the implement 300 are coupled to one another via a connection assembly 312. The connection assembly 312 may include one or more gears, bearings, collars, joints, and/or other equivalent coupling mechanisms configured to couple the PTO shaft 306 to the corresponding shaft 310, such that rotation of the PTO shaft 306 drives the corresponding shaft 310 to rotate. In some embodiments, the implement 300 may be a non-powered implement, such as a vertical tillage implement, a primary tillage implement, a seeding implement, or a finishing implement. In such embodiments, the PTO shaft 306 of the vehicle 10 may not be coupled to a corresponding shaft 310 of the implement 300, or the vehicle 10 may not include a PTO shaft 306.

Figure 5:
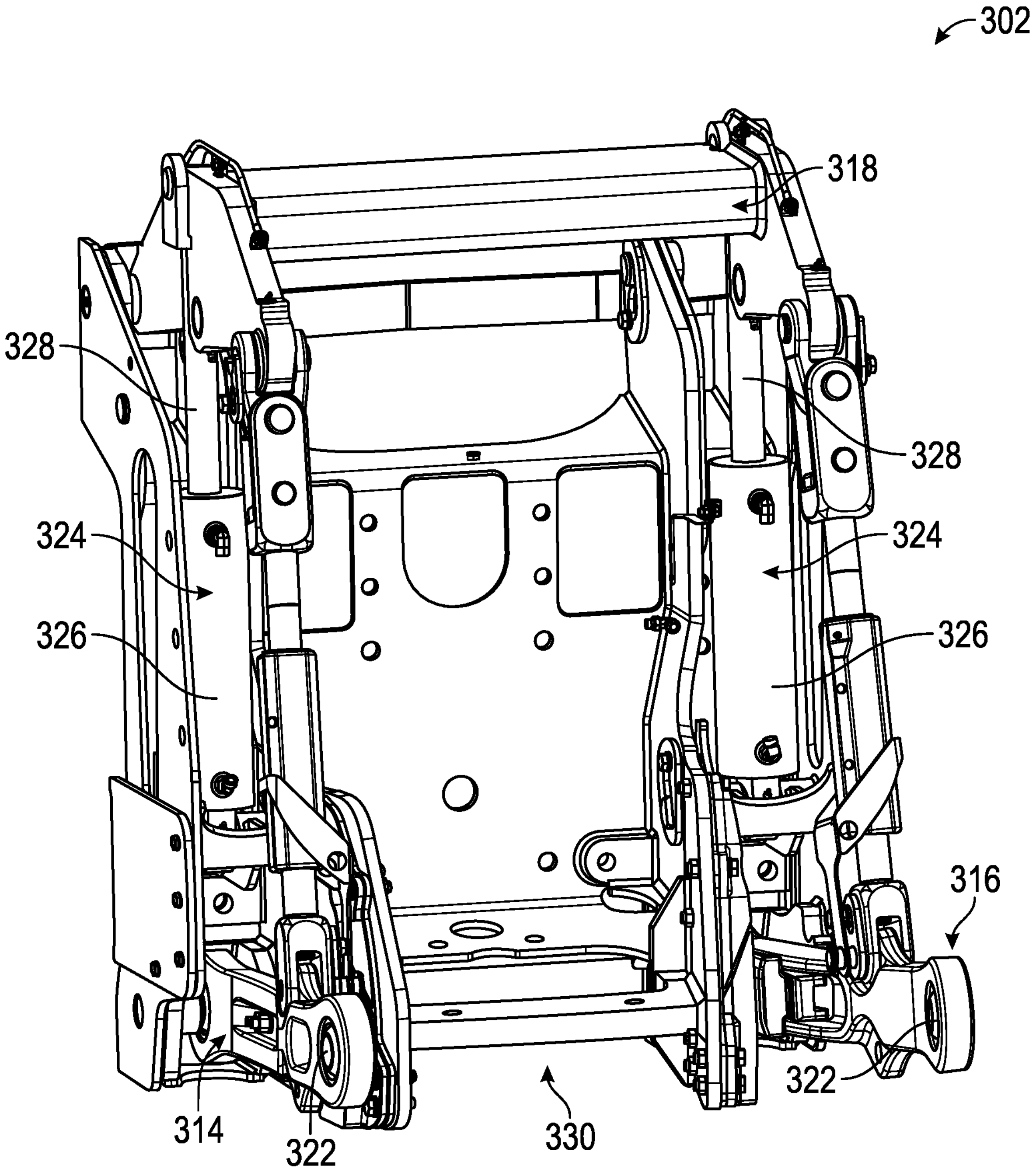
FIG. 5 is a top perspective view of a three-point hitch, according to an exemplary embodiment.
Figure 6:
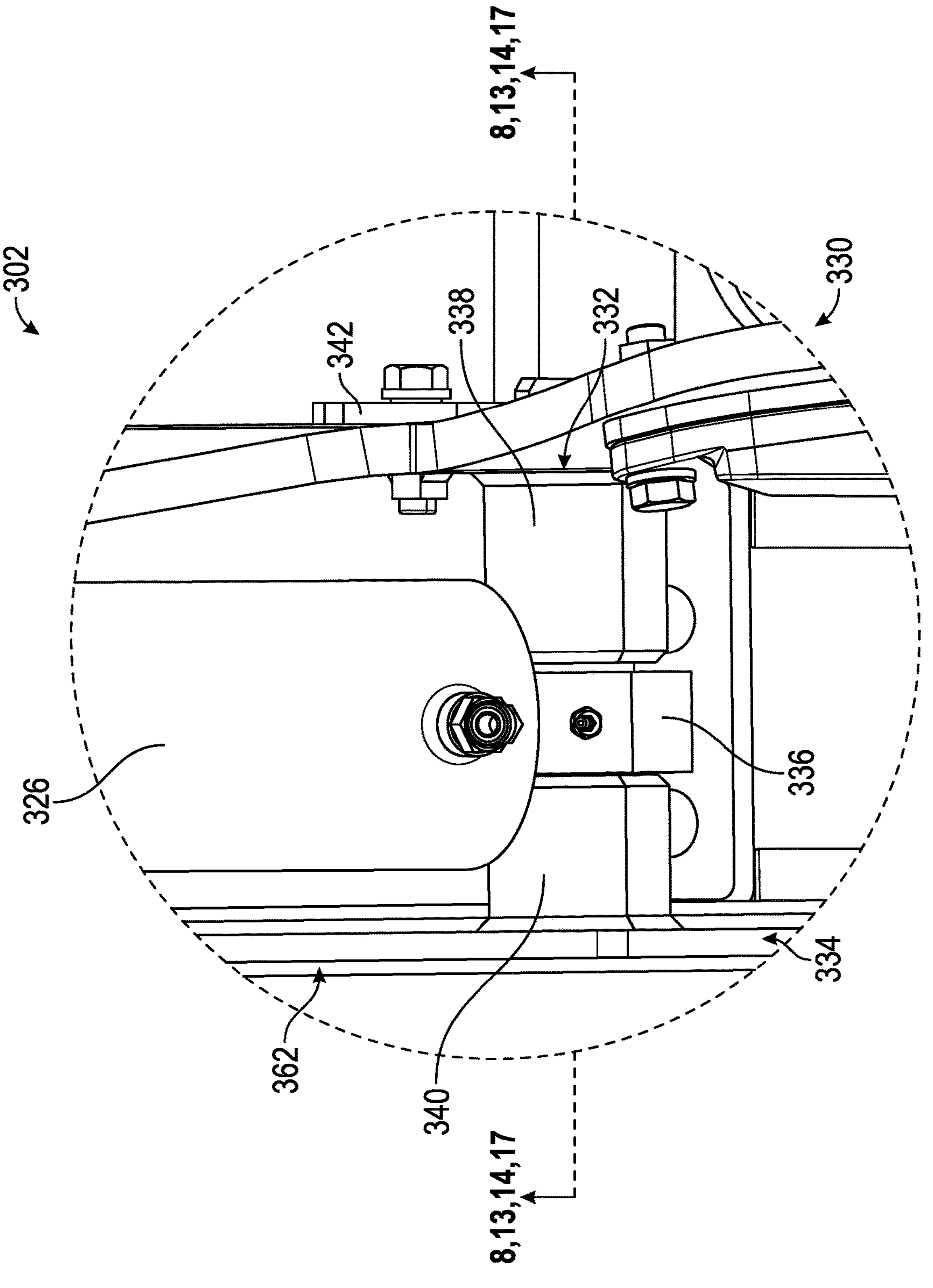
FIG. 6 is an enlarged view of a lift cylinder boss of the three-point hitch of FIG. 5.
Figure 7:
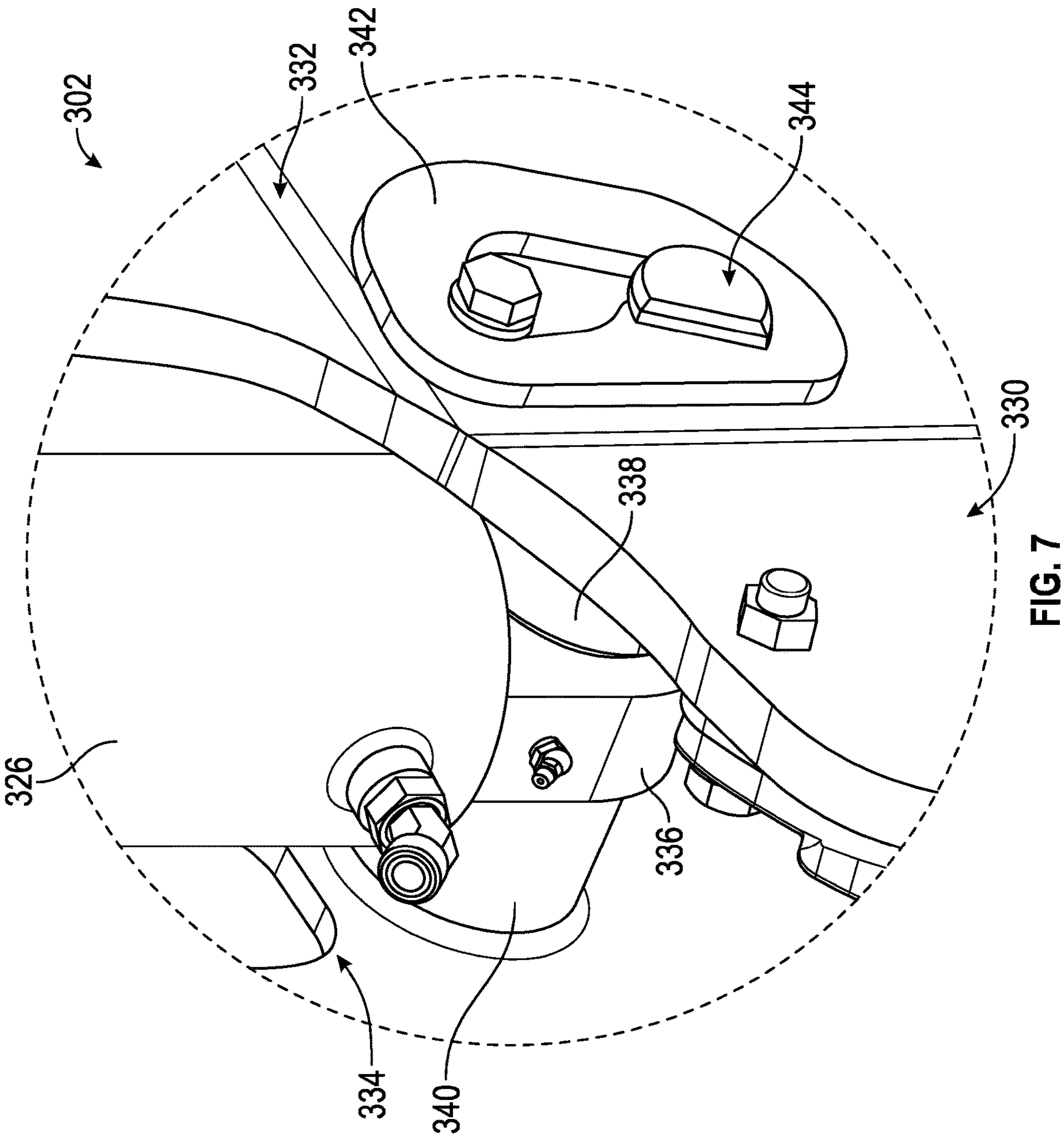
FIG. 7 is a top perspective view of the lift cylinder boss of FIG. 6, showing a pin extending through the lift cylinder boss.

With reference to FIGS. 4-5, the three-point hitch 302 includes a first draft arm 314, a second draft arm 316, and an upper link 318. The first draft arm 314 and the second draft arm 316 are coupled (e.g., rotatably coupled) to a chassis 320 of the vehicle 10 (see, e.g., FIG. 4). In some embodiments, each of the first draft arm 314 and the second draft arm 316 includes an opening 322 configured to receive a corresponding hitch pin of the implement 300. In some embodiments, each of the first draft arm 314 and the second draft arm 316 is coupled to a lift actuator 324. The lift actuators 324 are configured to drive the first draft arm 314 and the second draft arm 316 to rotate relative to the chassis 320 of the vehicle 10. Each of the lift actuators 324 includes a lift cylinder 326 and a lift piston 328 that moves relative to (e.g., extends and retracts) the lift cylinder 326. In some embodiments, each of the first draft arm 314, the second draft arm 316, and the lift cylinders 326, and the lift pistons 328 is coupled to a frame or chassis 330 of the three-point hitch 302.

In general, each of the lift cylinders 326 are coupled to the frame 330 by a coupling mechanism (e.g., a pin, a rod, etc.). It should be appreciated that although only one of the lift cylinders 326 and the surrounding portions of the frame 330 are described below, the following description symmetrically applies to the other lift cylinder 326 and the symmetric portions of the frame 330. Turning to FIGS. 6-9, the frame 330 of the three-point hitch 302 includes an inner frame wall 332 and an outer frame wall 334, and the lift cylinder 326 includes a lift cylinder boss 336 coupled to an end of the lift cylinder 326. The inner fame wall 332 includes an inner frame cylindrical boss 338 extending outwardly from an interior of the inner frame wall 332 in a direction toward the lift cylinder boss 336. Similarly, the outer frame wall 334 includes an outer frame cylindrical boss 340 extending outwardly from the outer frame wall 334 in a direction toward the lift cylinder boss 336.

In some embodiments, the inner frame wall 332 includes an anti-rotation clip 342 coupled to a first side of the inner frame wall 332 (e.g., a side of the inner frame wall 332 opposite to the inner frame cylindrical boss 338). In general, the anti-rotation clip 342 is configured to couple to an end of a pin 344 that protrudes outwardly from the first side of the inner frame wall 332 and prevent the pin 344 from rotating relative to the inner frame wall 332. As will be described herein, in some embodiments, the pin 344 includes a notch within which a portion of the anti-rotation clip 342 is received. Because the anti-rotation clip 342 is coupled (e.g., non-rotatably coupled) to the first side of the inner frame wall 332, the engagement between the pin 344 and the anti-rotation clip 342 prevents the pin 344 from rotating relative to the inner frame wall 332.

Figure 8:
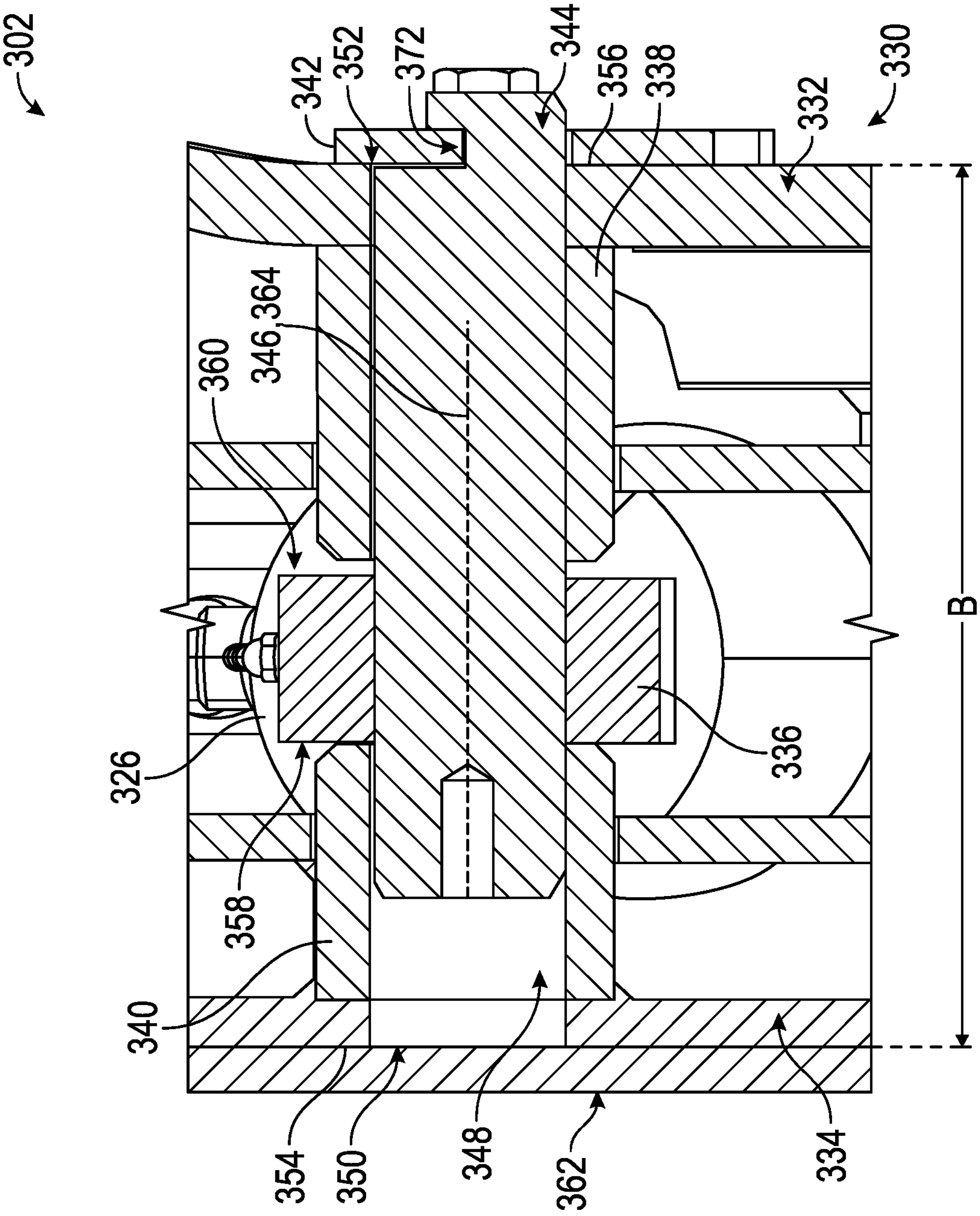
FIG. 8 is a cross-sectional view of a the lift cylinder boss of FIG. 6 taken along line 8-8 and showing a pin installed into a pin bore.
Figure 9:
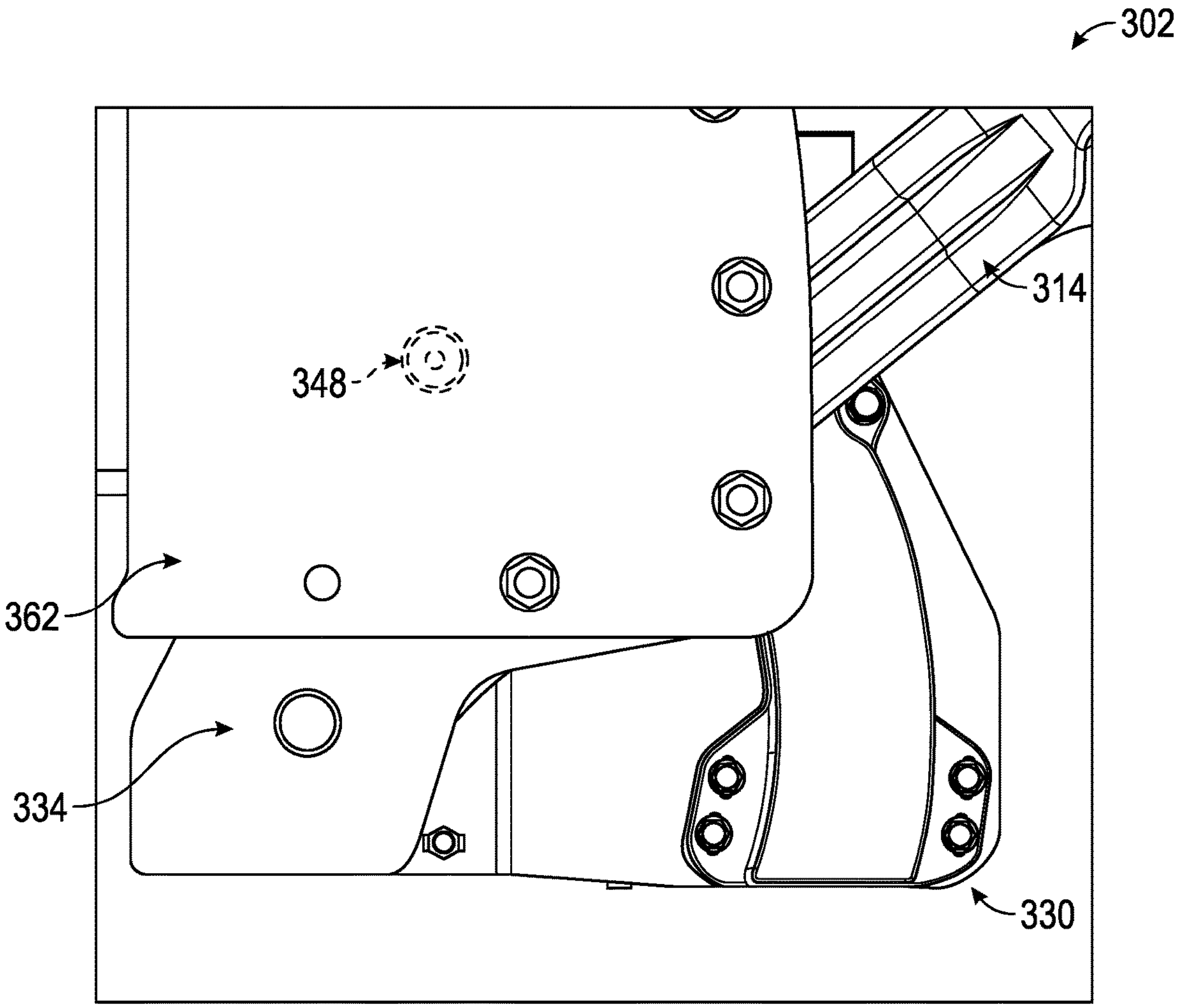
FIG. 9 is a side view of the three-point hitch of FIG. 5 showing a pin bore being a blind hole.

With specific reference to FIG. 8, each of the inner frame wall 332, the outer frame wall 334, the inner frame cylindrical boss 338, the outer frame cylindrical boss 340, and the lift cylinder boss 336 includes a hollow bore extending therethrough. The bores of the inner frame wall 332, the outer frame wall 334, the inner frame cylindrical boss 338, the outer frame cylindrical boss 340, and the lift cylinder boss 336 are axially aligned along a boss axis 346 and combine to form a pin bore 348 that extends along the boss axis 346. In general, the pin bore 348 extends axially between the inner frame wall 332 and the outer frame wall 334, and axially through the lift cylinder boss 336. In some embodiments, the pin bore 348 defines a substantially a constant diameter as the pin bore 348 extends along the boss axis 346.

The pin bore 348 includes a first bore end 350 and an axially opposing second bore end 352. In some embodiments, the first bore end 350 is aligned with an axially-outer edge 354 (e.g., to the left from the perspective of FIG. 8) of the outer frame wall 334, and the second bore end 352 is aligned with an axially-inner edge 356 (e.g., to the right from the perspective of FIG. 8 or toward a center of the three-point hitch 302). The pin bore 348 defines an axial bore length B between the first bore end 350 and the second bore end 352. In some embodiments, the lift cylinder boss 336 includes a first cylinder boss end 358 and an axially opposing second cylinder boss end 360. The first cylinder boss end 358 is arranged adjacent to or facing the first bore end 350, and the second cylinder boss end 360 is arranged adjacent to or facing the second bore end 352.

The pin 344 is configured to be received within the pin bore 348 so that the pin 344 extends axially through the lift cylinder boss 336. With the pin 344 installed into the pin bore 348, the pin 344 also extends through at least a portion of the inner frame cylindrical boss 338, the outer frame cylindrical boss 340. Accordingly, the pin 344 couples the lift cylinder boss 336, and the lift cylinder 326 coupled thereto, to the frame 330. As shown in FIG. 8, when the pin 344 is properly inserted into the pin bore 348, an end of the pin 344 (e.g., a right end from the perspective of FIG. 8) protrudes from the second bore end 352 of the pin bore 348 to expose a notch of the pin 344 that the anti-rotation clip 342 engages to prevent the pin 344 from rotating within the pin bore 348.

As described herein, vehicle and hitch developments are leading to an increasing amount of components being installed on and adjacent to the three-point hitch 302. In some embodiments, an outer plate 362 (e.g., of an axle or an axle gusset) is arranged adjacent to or in engagement with the outer frame wall 334. That is, the outer plate 362 is arranged close enough to the outer frame wall 334 that access to the pin bore 348 is prevented from an exterior of the three-point hitch 302. This arrangement defines the pin bore 348 as a blind hole and only allows access to the pin bore 348 from an interior of the three-point hitch 302. As described herein, the pin 344 is designed to enable efficient installation into and removal from the pin bore 348 while accommodating the additional components arranged adjacent to or within the three-point hitch 302.

Figure 10:
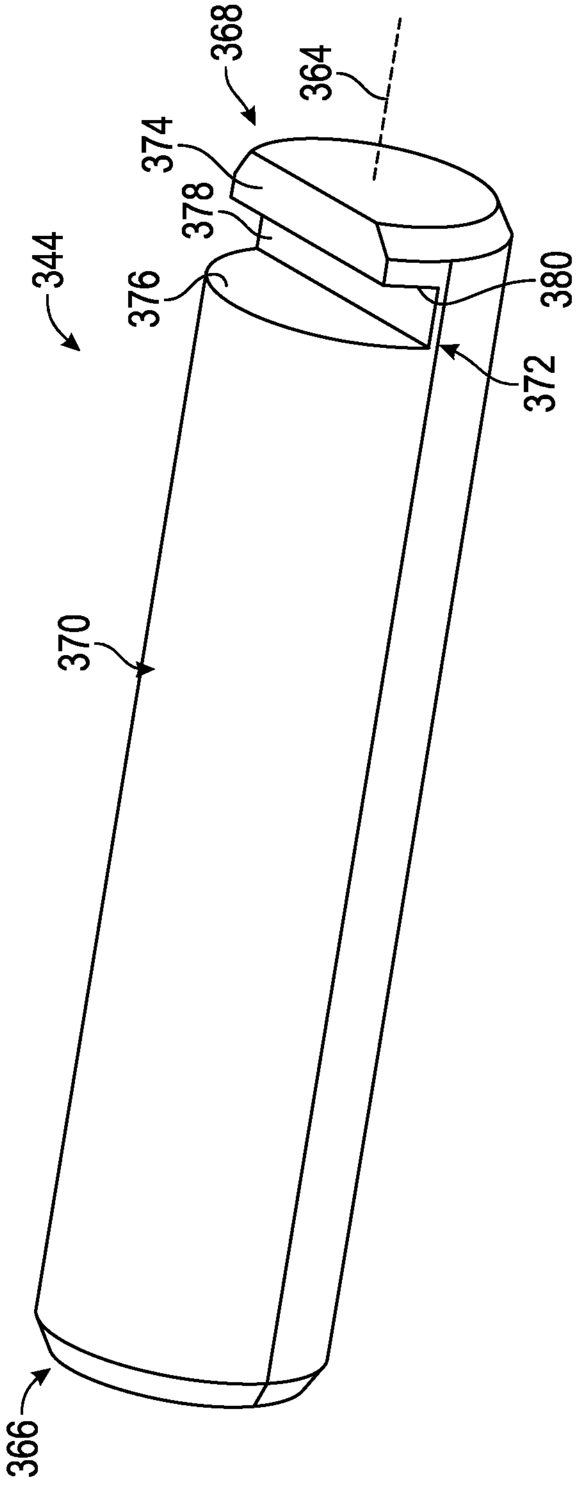
FIG. 10 is a top perspective view of a pin of the three-point hitch of FIG. 5, according to an exemplary embodiment.
Figure 11:
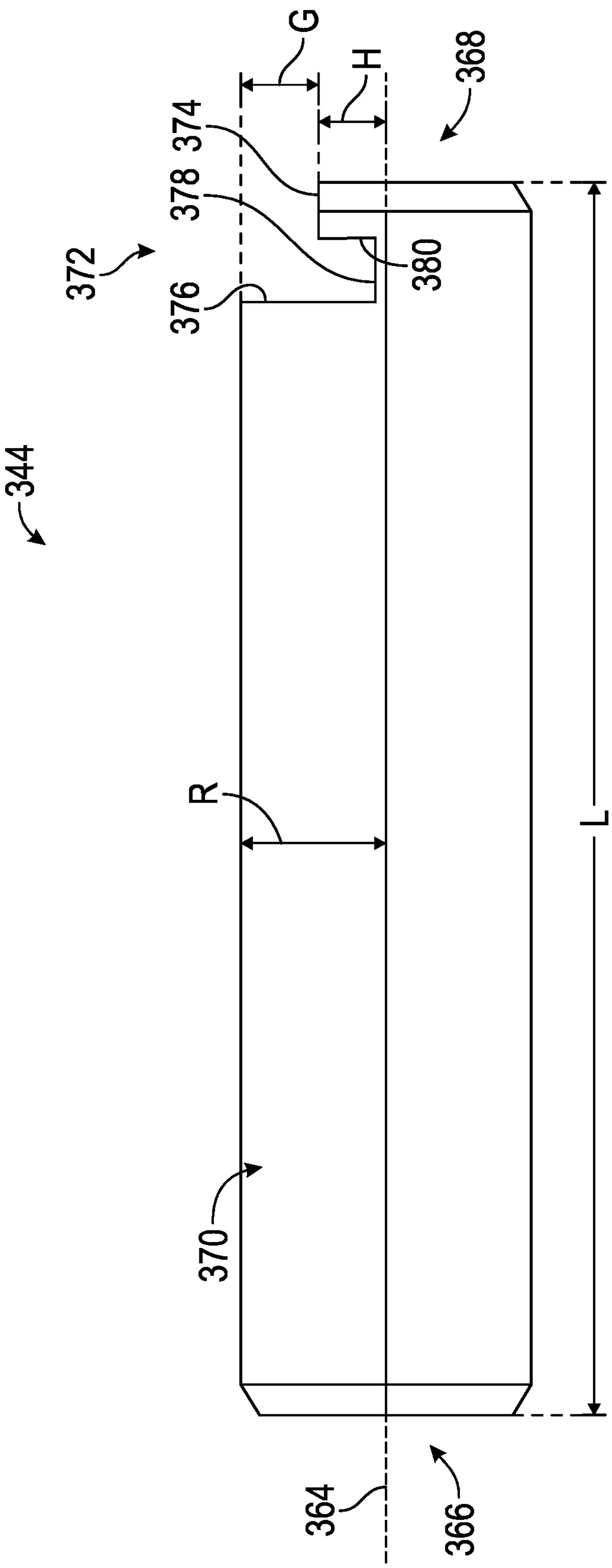
FIG. 11 is a side view of the pin of FIG. 10.
Figure 12:
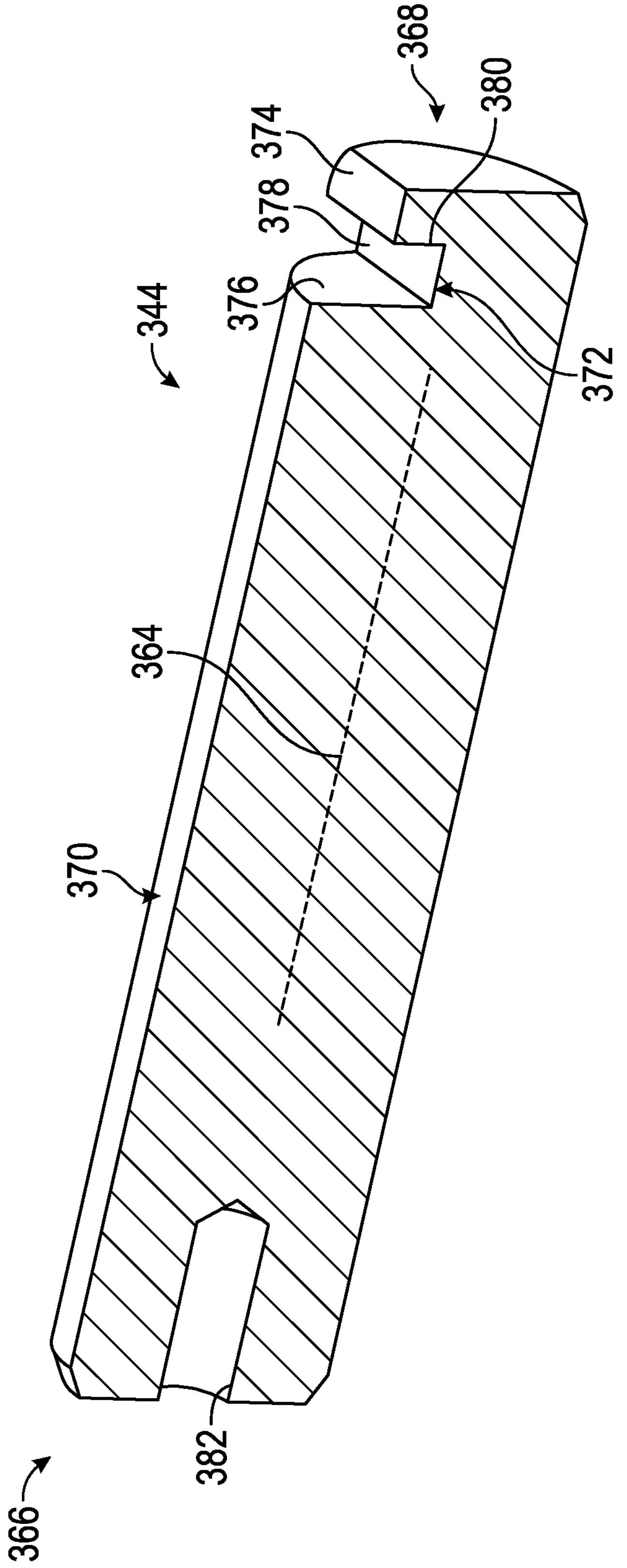
FIG. 12 is a cross-section view of the pin of FIG. 10 taken along line 12-12.

With reference to FIGS. 10-12, the pin 344 defines a pin axis 364 and includes a first pin end 366, an axially opposing second pin end 368, and a cylindrical body 370. The pin 344 defines an axial pin length L between the first pin end 366 and the second pin end 368. The cylindrical body 370 extends axially from the first pin end 366 toward the second pin end 368 and defines a substantially constant radius R relative to the pin axis (see, e.g., FIG. 11). The pin 344 includes a pin notch 372 and a retrieval surface 374 that both interrupt the cylindrical body 370 at the second pin end 368. For example, the pin notch 372 and the retrieval surface 374 interrupt the circumferential profile defined by the cylindrical body 370 by defining cutouts that do not extend radially into the cylindrical body 370. In general, the pin notch 372 extends into the cylindrical body 370 in a direction that is perpendicular to the pin axis 364.

In some embodiments, the pin notch 372 is formed by a first notch surface 376, a second notch surface 378, and a third notch surface 380. Moving from the first pin end 366 toward the second pin end 368, the first notch surface 376 extends in a direction perpendicular to and toward the pin axis 364 (e.g., downward from the perspective of FIG. 11) from a junction between the cylindrical body 370 and the first notch surface 376 to a junction between the first notch surface 376 and the second notch surface 378. The second notch surface 378 extends in a direction parallel to the pin axis 364 (e.g., to the right from the perspective of FIG. 11) from a junction between the first notch surface 376 and the second notch surface 378 to a junction between the second notch surface 378 and the third notch surface 380. The third notch surface 380 extends in a direction perpendicular to and away from the pin axis 364 (e.g., upward from the perspective of FIG. 11) from a junction between the second notch surface 378 and the third notch surface 380 to a junction between the third notch surface 380 and the retrieval surface 374. The retrieval surface 374 extends in a direction parallel to the pin axis 364 (e.g., to the right from the perspective of FIG. 11) from a junction between the third notch surface 380 and the retrieval surface 374 to the second pin end 368.

In general, the retrieval surface 374 is configured to provide a gap or clearance within which a tool can be inserted to retrieve the pin 344 from the pin bore 348. For example, the retrieval surface 374 defines a height H between the retrieval surface 374 and the pin axis 364 (e.g., measured in a direction perpendicular to the retrieval surface 374) that is less than the radius R of the cylindrical body 370. The difference between the radius R and the height H defines a gap G between the retrieval surface 374 and an radially-outermost point of the cylindrical body 370, which also forms a gap between the retrieval surface 374 and the outer wall of the pin bore 348. As will be described herein, the gap G enables a tool to be inserted into the pin bore 348 and over the retrieval surface 374 to engage the pin notch 372 and at least partially remove the pin 344.

In some embodiments, the pin 344 includes a threaded bore 382 extending axially into the first pin end 366 in a direction toward the second pin end 368. The threaded bore 382 defines a diameter that is less than a diameter of the cylindrical body 370 and extends axially along the pin axis 364 from the first pin end 366 to a location between the first pin end 366 and the second pin end 368.

Figure 13:
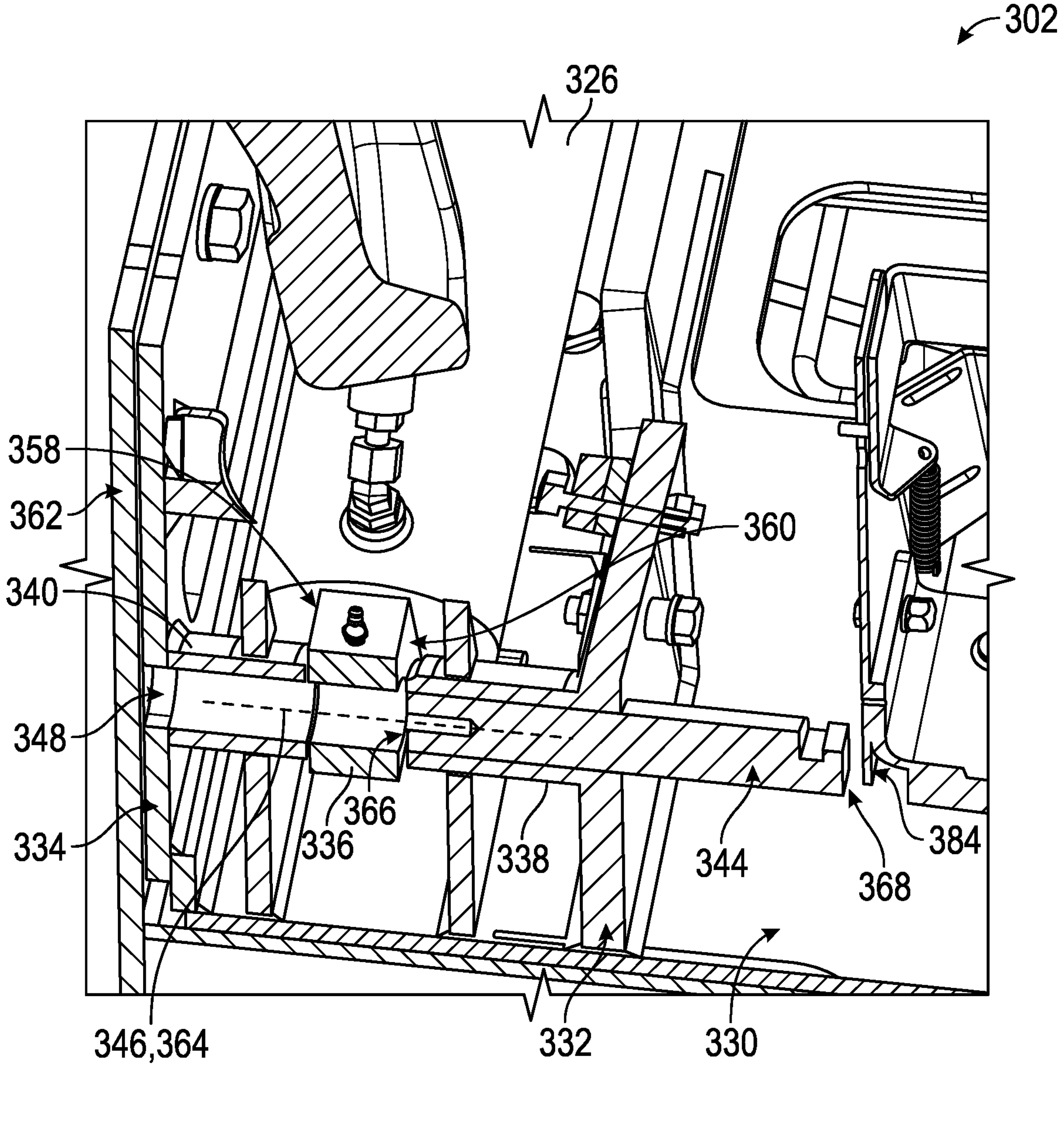
FIG. 13 is a cross-sectional view of a the lift cylinder boss of FIG. 6 taken along line 13-13 and showing a pin being removed from a pin bore.

With reference to FIG. 13, in some embodiments, the three-point hitch includes an interior plate 384 (e.g., a PTO shield) arranged along a removal path (i.e., arranged along the boss axis 346) that limits how far the pin 344 can be removed from the pin bore 348. In general, the axial pin length L of the pin 344 is design to allow the pin 344 to be removed from the pin bore 348 and clear the lift cylinder boss 336 prior to the pin 344 engaging the interior plate 384. In other words, the axial pin length L is less than a removal length defined along the boss axis 346 between the second cylinder boss end 360 and the interior plate 384 so that as the pin 344 is removed from the pin bore 348, the first pin end 366 moves past the second cylinder boss end 360 prior to the second pin end 368 engaging the interior plate 384. By clearing the cylinder boss 336 prior to engaging the interior plate 384, the pin 344 enables the lift cylinder 326 to be serviced without requiring removal of the interior plate 384, which reduces an amount of time required to service the lift cylinder 326.

In general, to ensure that the lift cylinder 326 can be serviced without removal of the lift cylinder 326, the axial pin length L is shortened when compared to conventional cylinder boss pins. In some embodiments, the axial pin length L is less than the axial bore length B, which brings about a potential for the pin 344 to be inserted completely into the pin bore 348 (e.g., with both pin ends 366, 368 being arranged axially within the bore ends 350, 352). As described herein, in some embodiments, the pin bore 348 may act as a blind hole with the outer plate 362 preventing access to the pin 344 from an exterior of the three-point hitch 302. Accordingly, the pin 344 is designed to includes the pin notch 372 and the retrieval surface 374 to enable a user to selectively remove the pin 344 from within the pin bore 348, if the pin 344 is over-inserted.

Figure 14:
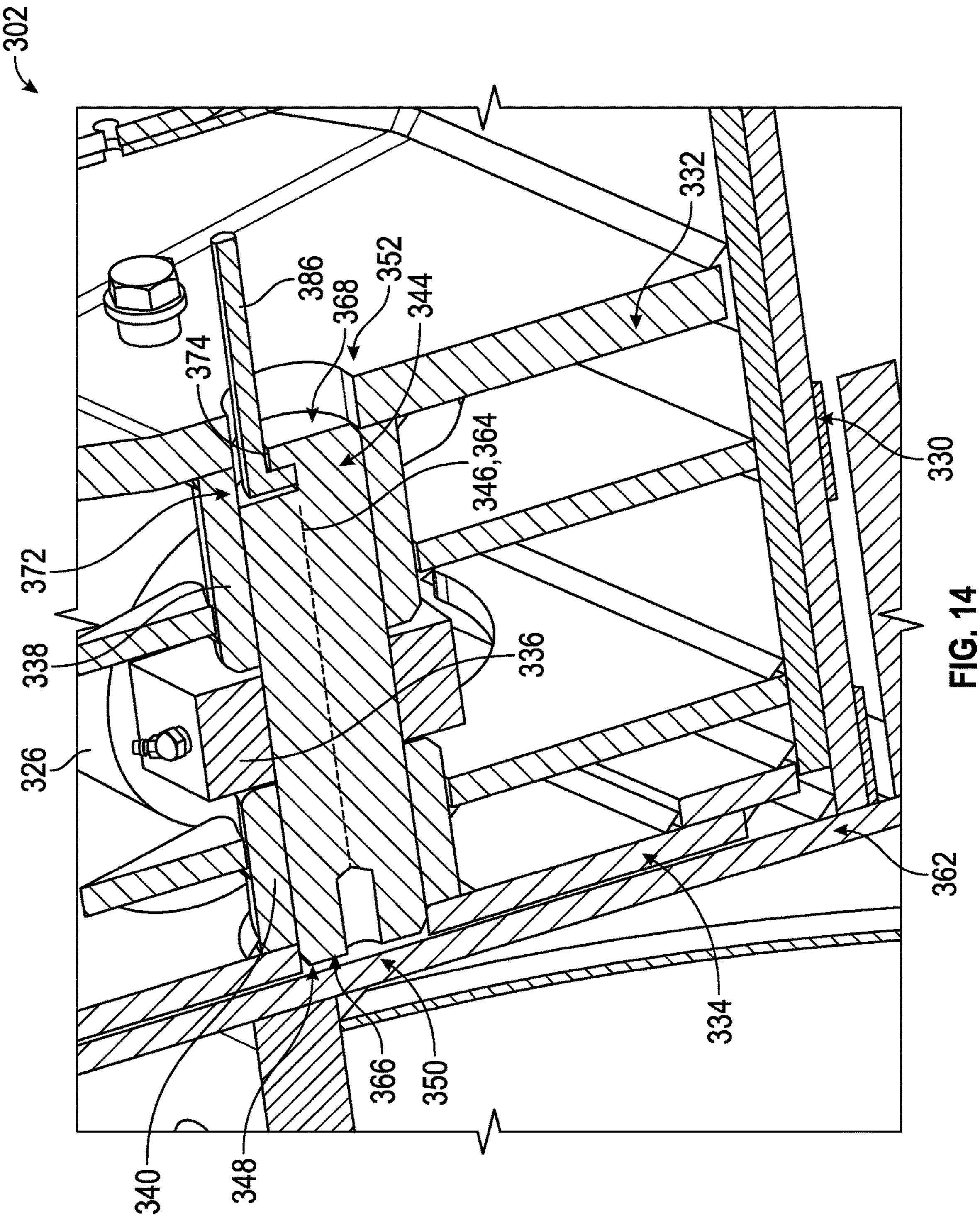
FIG. 14 a cross-sectional view of a the lift cylinder boss of FIG. 6 taken along line 14-14 and showing a pin being removed from a pin bore using a tool.

With reference to FIG. 14, in some embodiments, when the pin 344 is inserted into the pin bore 348 and the second end 368 of the pin 344 is inserted past the second bore end 352 of the pin bore 348, a tool 386 is configured to be inserted over the retrieval surface 374 and remove the second end 368 of the pin 344 outwardly past the second bore end 352 (e.g., to the axial position shown in FIG. 8 where the anti-rotation clip 342 may be installed). As described herein, the height H of the retrieval surface 374 being less than the radius R of the cylindrical body 370 provides the gap G through which the tool 386 may be inserted. In the illustrated embodiments, the tool 386 is a pry bar that includes a latch that engages the pin notch 372 to couple to the pin 344 and allow a user to remove the pin 344. In some embodiments, the tool 386 may be a crow bar, a screw driver, a piece of wire, or any other equivalent tool capable of being inserted over the retrieval surface 374 and engaging the pin notch 372.

As described herein, the design of the pin 344 enables the lift cylinder 326 to be serviced without requiring the removal of any additional components mounted adjacent to or within the three-point hitch 302 (e.g., the outer plate 362 and the interior plate 384), even when the pin bore 348 acts as a blind hole and access to the pin 344 is blocked from one side of the pin bore 348. And the pin 344 is designed to accommodate for the pin bore 348 being a blind hole and enable a user to retrieve the pin 344 if it is over inserted into the pin bore 348.

Figure 15:
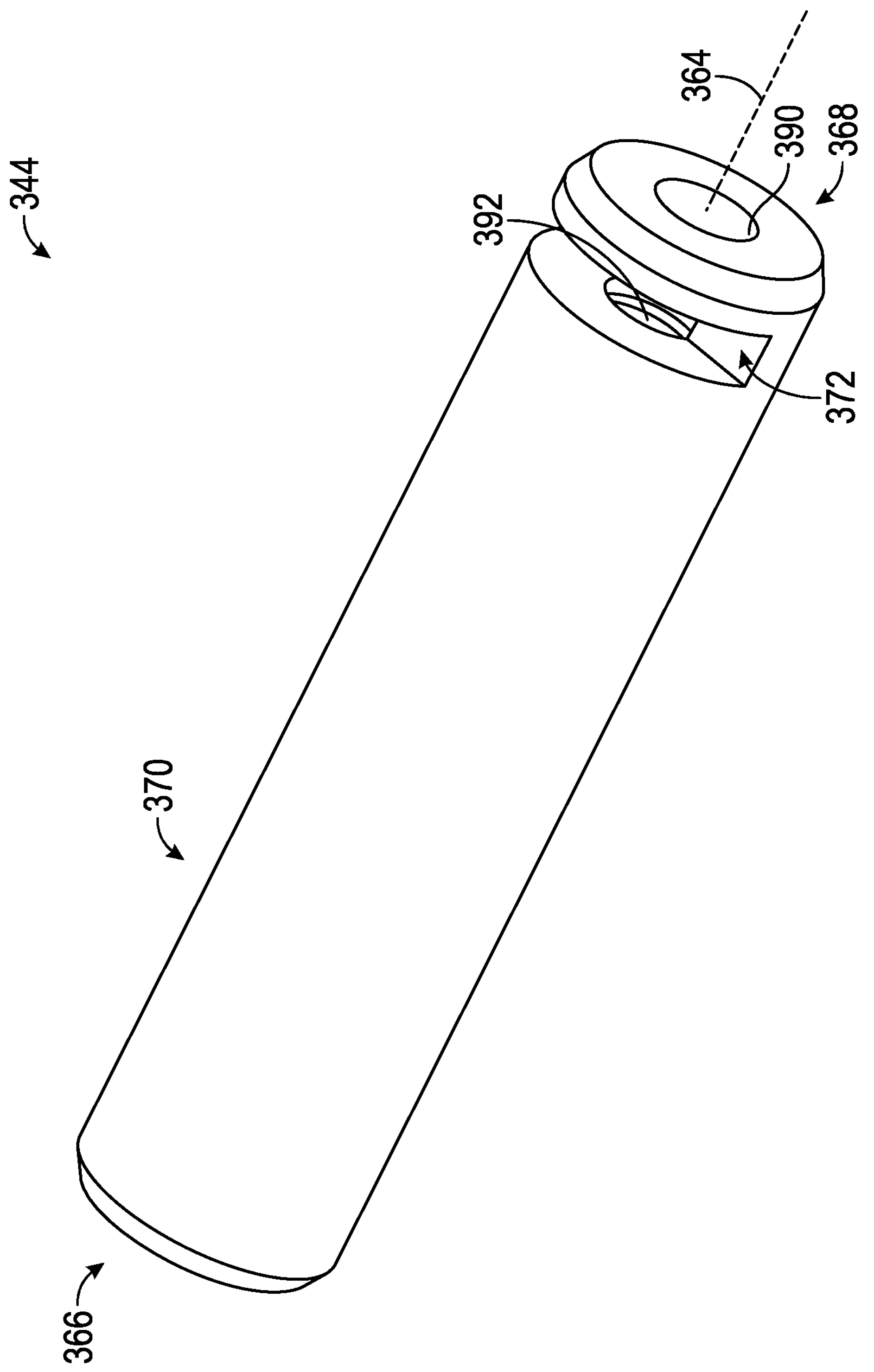
FIG. 15 is a top perspective view of a pin of the three-point hitch of FIG. 5, according to another exemplary embodiment.
Figure 16:
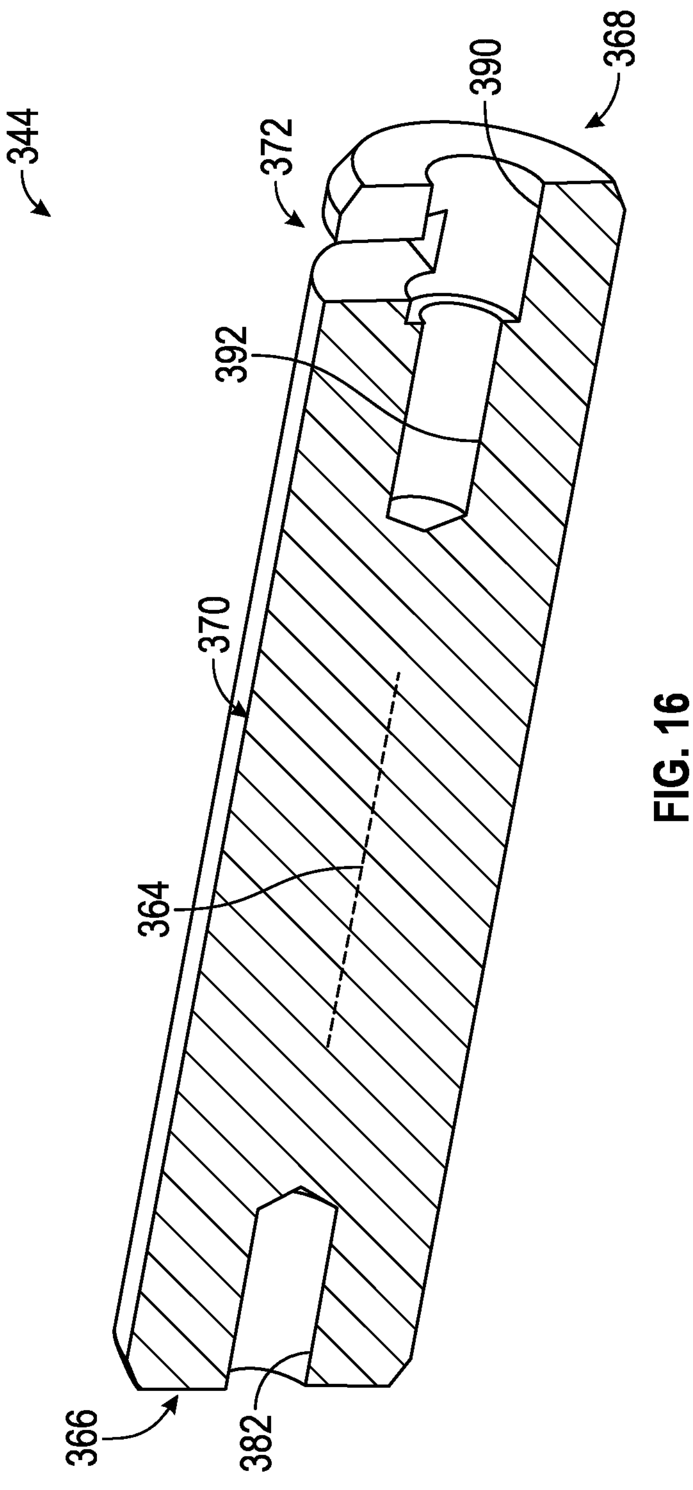
FIG. 16 is a cross-sectional view of the pin of FIG. 15 taken along line 16-16.

FIGS. 15 and 16 illustrate another embodiment of the pin 344. The pin 344 of FIGS. 15 and 16 may be similar to the pin 344 of FIGS. 10-12, with like features identified using similar reference numerals, except as described below or as apparent from the figures. In the illustrated embodiment, the pin 344 includes a counterbore 390 extending into the second pin end 368. The counterbore 390 leads to a threaded bore 392 extending axially along the pin axis 364. The inclusion of the counterbore 390 and the threaded bore 392 enable a threaded rod to be inserted through the counterbore 390 and threaded into the threaded bore 392, for example, to remove the pin 344 from the pin bore 348 if it is over-inserted.

Figure 17:
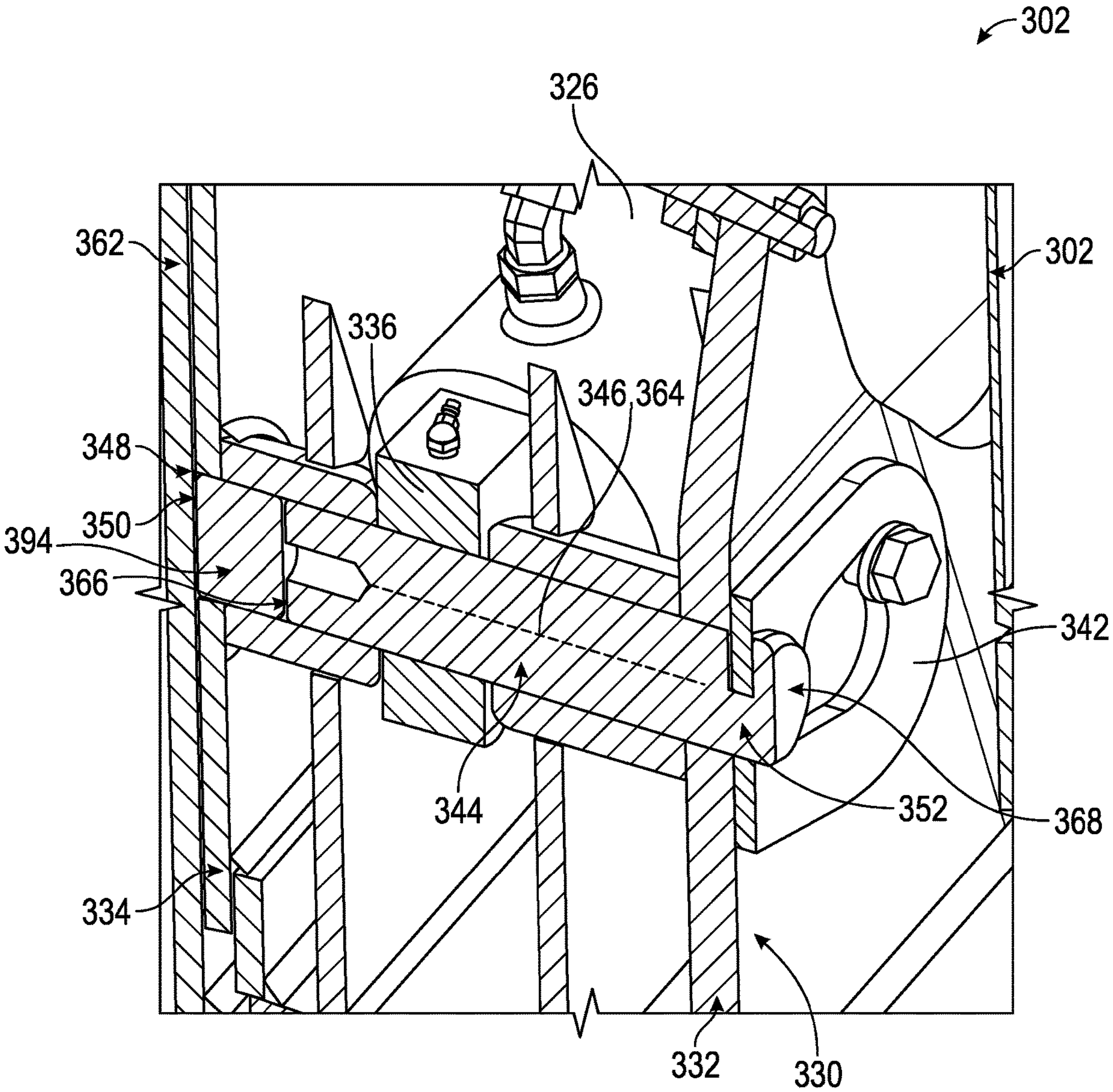
FIG. 17 is a cross-sectional view of a the lift cylinder boss of FIG. 6 taken along line 17-17 and showing a pin being installed in a pin bore with a bore insert, according to another exemplary embodiment.

FIG. 17 illustrates another embodiment of the three-point hitch 302 where a plug or insert 394 is arranged within the pin bore 348 at the first bore end 350. The plug 394 is configured to act as an axial stop for the pin 344 that ensures the first pin end 366 engages the plug 394 prior to the second pin end 368 being inserted axially past the second bore end 352, which prevents the pin 344 from being over-inserted.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 200, the three-point hitch 302, the pin 344, etc.) as shown in the various exemplary embodiments is illustrative only. Additionally, any element disclosed in one embodiment may be incorporated or utilized with any other embodiment disclosed herein.

What is claimed is:

1. A three-point hitch for a vehicle, comprising:

a frame including an inner frame wall and an outer frame wall;

a lift cylinder coupled to the frame and including a lift cylinder boss arranged at an end of the lift cylinder;

a pin opening extending between the inner frame wall and the outer frame wall and through the lift cylinder boss, wherein the pin opening extends along a boss axis and includes a first bore end and an axially opposing second bore end, the pin opening defining an axial bore length between the first bore end and the second bore end; and a pin configured to be received within the pin opening so that the pin extends through the lift cylinder boss and couples the lift cylinder to the frame, wherein the pin defines a pin axis and includes a first pin end, an axially opposing second pin end, and a cylindrical body, wherein the cylindrical body is interrupted by a pin notch and a retrieval surface arranged at the second pin end, the retrieval surface defining a flat surface with a height measured along a radial direction between the pin axis and the retrieval surface that is both constant and less than a radius defined by the cylindrical body, wherein an axial pin length defined between the first pin end and the second pin end is less than the axial bore length, wherein the three-point hitch is operable in a first configuration in which the pin is inserted into the pin opening and the second pin end is inserted past the second bore end, and wherein a tool is configured to be inserted over the retrieval surface and remove the second pin end outwardly past the second bore end when the three-point hitch is in the first configuration.

2. The three-point hitch of claim 1, wherein the frame includes an interior plate arranged axially inwardly along the boss axis from the inner frame wall.

3. The three-point hitch of claim 2, wherein the lift cylinder boss includes a first cylinder boss end and an axially opposing second cylinder boss end.

4. The three-point hitch of claim 3, wherein a removal length is defined along the boss axis between the second cylinder boss end and the interior plate.

5. The three-point hitch of claim 4, wherein the axial pin length is less than the removal length so that as the pin is removed from the pin opening, the first pin end moves past the second cylinder boss end prior to the second pin end engaging the interior plate.

6. The three-point hitch of claim 1, wherein the inner frame wall includes an inner frame cylindrical boss extending axially from the inner frame wall in a direction toward the lift cylinder boss, and the outer frame wall including an outer frame cylindrical boss extending axially from the outer frame wall in a direction toward the lift cylinder boss, and wherein the outer frame cylindrical boss, the inner frame cylindrical boss, and the lift cylinder boss are axially aligned along the boss axis and combine to define the pin opening.

7. A three-point hitch for a vehicle, comprising:

a frame including an interior plate;

a lift cylinder coupled to the frame and including a lift cylinder boss arranged at an end of the lift cylinder;

a pin opening extending axially through the lift cylinder boss along a boss axis, the pin opening including a first bore end and an axially opposing second bore end, wherein the lift cylinder boss includes a first cylinder boss end and an axially opposing second cylinder boss end, the second cylinder boss end being arranged adjacent to the second bore end, wherein a removal length is defined along the boss axis between the second cylinder boss end and the interior plate;

a pin configured to be received within the pin opening so that the pin extends through the lift cylinder boss and couples the lift cylinder to the frame, wherein the pin defines a pin axis, a first pin end, and an axially opposing second pin end, and a cylindrical body, wherein the cylindrical body is interrupted by a pin notch and a retrieval surface arranged at the second pin end, the retrieval surface defining a flat surface with a height measured along a radial direction between the pin axis and the retrieval surface that is both constant and less than a radius defined by the cylindrical body, wherein an axial pin length defined between the first pin end and the second pin end is less than the removal length so that as the pin is removed from the pin opening, the first pin end moves past the second cylinder boss end prior to the second pin end engaging the interior plate, and wherein the three-point hitch is operable in a first configuration in which the pin is inserted into the pin opening and the second pin end is inserted past the second bore end, and wherein, in the first configuration, a tool is configured to be inserted over the retrieval surface and remove the second pin end outwardly past the second bore end.

8. The three-point hitch of claim 7, wherein the pin includes a cylindrical body extending axially from the first pin end toward the second pin end.

9. The three-point hitch of claim 8, wherein the cylindrical body is interrupted by a pin notch and a retrieval surface arranged at the second pin end.

10. The three-point hitch of claim 7, wherein the pin opening defines an axial bore length between the first bore end and the second bore end.

11. The three-point hitch of claim 10, wherein the axial pin length is less than the axial bore length.

12. A three-point hitch for a vehicle, comprising:

a frame including an inner frame wall and an outer frame wall;

a lift cylinder coupled to the frame and including a lift cylinder boss arranged at an end of the lift cylinder, the inner frame wall including an inner frame cylindrical boss extending outwardly from the inner frame wall in a direction toward the lift cylinder boss, and the outer frame wall including an outer frame cylindrical boss extending outwardly from the outer frame wall in a direction toward the lift cylinder boss, wherein the outer frame cylindrical boss, the inner frame cylindrical boss, and the lift cylinder boss are axially aligned along a boss axis and combine to define a pin opening that extends along the boss axis, and wherein the pin opening includes a first bore end and an axially opposing second bore end; and a pin configured to be received within the pin opening so that the pin extends through the lift cylinder boss and couples the lift cylinder to the frame, wherein the pin defines a pin axis and includes a first pin end, an axially opposing second pin end, and a cylindrical body, and wherein the cylindrical body is interrupted by a pin notch and a retrieval surface arranged at the second pin end, the retrieval surface defining a height between the pin axis and the retrieval surface that is both constant and less than a radius defined by the cylindrical body wherein the three-point hitch is operable in a first configuration in which the pin is inserted into the pin opening and the second end of the pin is inserted past the second bore end of the pin opening, and wherein, in the first configuration, a tool is configured to be inserted over the retrieval surface and remove the second pin end outwardly past the second bore end.

13. The three-point hitch of claim 12, wherein the pin opening defines an axial bore length between the first bore end and the second bore end.

14. The three-point hitch of claim 13, wherein an axial pin length defined between the first pin end and the second pin end is less than the axial bore length.

15. The three-point hitch of claim 12, wherein the frame includes an interior plate arranged axially inwardly along the boss axis from the inner frame wall.

16. The three-point hitch of claim 15, wherein the lift cylinder boss includes a first cylinder boss end and an axially opposing second cylinder boss end.

17. The three-point hitch of claim 16, wherein a removal length is defined along the boss axis between the second cylinder boss end and the interior plate.

18. The three-point hitch of claim 17, wherein an axial pin length defined between the first pin end and the second pin end is less than the removal length so that as the pin is removed from the pin opening, the first pin end moves past the second cylinder boss end prior to the second pin end engaging the interior plate.

* * * * *